United States Patent [19]
Baybrook et al.

[11] 3,716,691
[45] Feb. 13, 1973

[54] SHIELDED ARC WELDING WITH AUSTENITIC STAINLESS STEEL

[75] Inventors: Howard E. Baybrook, Leechburg; Joseph A. Chivinsky, Sarver, both of Pa.

[73] Assignee: Allegheny Ludlum Industries, Inc., Pittsburgh, Pa.

[22] Filed: April 27, 1971

[21] Appl. No.: 137,957

[52] U.S. Cl..................................219/137, 219/145
[51] Int. Cl. ..........................................B23k 35/00
[58] Field of Search.....219/137, 145, 146; 75/128 A, 75/128 N, 128 W

[56] References Cited

UNITED STATES PATENTS

| 3,311,511 | 3/1967 | Goller | 148/12 |
| 3,235,378 | 2/1966 | Jennings | 75/128 A |
| 3,554,791 | 1/1971 | Johnson et al. | 219/146 |
| 3,171,738 | 3/1965 | Renshaw et al. | 75/128 A |

*Primary Examiner*—J. V. Truhe
*Assistant Examiner*—George A. Montanye
*Attorney*—Vincent G. Gioia and Robert F. Dropkin

[57] ABSTRACT

An austenitic stainless steel which is suitable for use as a filler metal in gas shielded arc welding and a gas shielded arc welding process employing said steel as a filler metal. The steel consists essentially of, in weight percent, up to 0.1 percent carbon, 7.5 – 16.0 percent manganese, up to 1.0 percent silicon, 17.5 – 26.0 percent chromium, 5.0 – 17.0 percent nickel, 0.75 – 4.0 percent molybdenum, 0.2 – 0.38 percent nitrogen, balance iron and incidental impurities, and is additionally limited as follows:

1. The ratio of austenitizing elements to ferritizing elements is greater than 1 in accordance with the following expression:

$$[\% Ni + 30 (\%C + \%N) + 0.5 (\%Mn)]/[\%Cr + \%Mo + 1.5 (\%Si)] > 1$$

2. The manganese to nitrogen ratio is at least 42; and

3. The sum of the chromium, manganese, nickel and molybdenum content is at least 38.

11 Claims, No Drawings

SHIELDED ARC WELDING WITH AUSTENITIC STAINLESS STEEL

Austenitic stainless steels exhibit a combination of highly desirable properties that make them suitable for a wide variety of industrial applications. The most common type of austenitic stainless steel is 18-8 which contains approximately 18 percent chromium and 8 percent nickel. Another type of austenitic stainless steel is described in U.S. Pat. No. 3,171,738 which issued on Mar. 2, 1965. It is comprised of molybdenum, chromium, nickel, manganese and nitrogen. More specifically, it contains up to 0.1 percent carbon, 2 – 3 percent molybdenum, up to 0.5 percent silicon, 7.5 – 9.0 percent manganese, 17.5 – 22 percent chromium, 5 – 7 percent nickel, 0.25 – 0.50 percent nitrogen, balance iron and incidental impurities. Nitrogen is incorporated within the alloy to increase its strength and austenitic stability.

The alloy described in U.S. Pat. No. 3,171,738 has good corrosion resistance and good mechanical properties but is only adequate as a welding material for heavy sections. Its nitrogen content was found to be excessive and at a level which caused porous, unsound welds. More specifically, its nitrogen is at or near its equilibrium solubility level in the molten state.

An obvious way of improving the welding characteristics of the patented alloy would be to lower its nitrogen content. Unfortunately, this would adversely affect the strength of the alloy as well as its austenitic stability. As discussed above, nitrogen improves the alloy's strength and has a strong austenitizing affect.

The present invention provides an alloy which is superior in certain respects, to the alloys described in the above-referred to patent. It has good welding properties as well as good corrosion resistance and good mechanical properties. Moreover, it is substantially different from those described in the prior art, such as those disclosed in U.S. Pat. Nos. 3,235,378 and 3,311,511 which respectively issued on Feb. 15, 1966 and Mar. 28, 1967. The alloy maintains a relatively high level of nitrogen through careful balancing of its chemistry and is particularly adaptable for use as a filler metal; e.g., a welding wire, in gas shielded arc welding.

It is accordingly an object of this invention to provide an austenitic stainless steel filler metal for use in gas shielded arc welding.

It is another object of this invention to provide a weldable austenitic stainless steel.

It is a further object of this invention to provide a process for producing a substantially non-porous, sound weld by arc welding in a shielding gas atmosphere.

The alloy of the present invention is a weldable austenitic stainless steel which is particularly adaptable for use as a filler metal in gas shielded arc welding. It consists essentially of, in weight percent, up to 0.1 percent carbon, 7.5 – 16.0 percent manganese, up to 1.0 percent silicon, 17.5 – 26.0 percent chromium, 5.0 – 17.0 percent nickel, 0.75 – 4.0 percent molybdenum, 0.2 – 0.38 percent nitrogen, balance iron and incidental impurities; e.g., sulphur and phosphorus, and is additionally limited as follows:

1. The ratio of austenitizing element to ferritizing elements is greater than 1 in accordance with the following expression:

$$[\%Ni + 30(\%C + \%N) + 0.5(\%Mn)]/[\%Cr + \%Mo + 1.5(\%Si)] > 1$$

2. The manganese to nitrogen ratio is at least 42; and
3. The sum of the chromium, manganese, nickel and molybdenum content is at least 38.

Chromium, molybdenum and silicon are ferritizing elements. Chromium is added for oxidation and corrosion resistance, molybdenum is added for corrosive pitting resistance, and silicon aids in the melting of the alloy, however, silicon is generally below 0.6 and preferably below 0.4 as silicon can render the alloy too fluid and hinder welding. Since they; i.e., chromium, molybdenum and silicon are ferritizers, their affect as such must be offset by the austenitizing affect of nickel, manganese, nitrogen and carbon in accordance with the following expression:

$$\%Ni + 30(\%C + \%N) + 0.5(\%Mn)/[\%Cr + \%Mo + 1.5(\%Si)] > 1$$

as ferrite adversely affects the alloys impact strength, corrosion resistance and hot workability. In addition to serving as austenitizers, nickel, manganese and nitrogen contribute to the properties of the alloy. For example, nickel contributes to the alloy's impact strength; i.e., it contributes by being present and by rendering the alloy austenitic, manganese increases the alloys capacity for nitrogen, and nitrogen contributes to the alloys strength. Carbon, another austenitizer, should be kept below 0.1 and preferably 0.05 as it can cause intergranular corrosion in the weld-heat affected zone. Preferred limits for chromium, nickel, molybdenum and nitrogen are 18.5 – 23.0 percent chromium, 10 – 16 percent nickel, 2 – 3 percent molybdenum and 0.22 – 0.33 percent nitrogen. Manganese is preferably between 8.5 and 14.0 percent. We have reason to believe that manganese is an austenitizer at levels up to 10, 11 or even 14 percent and some doubt beyond these levels, but in any event the alloy of this invention has to be austenitic and must have a ratio of austenitizing elements to ferritizing elements greater than 1, preferably greater than 1.1, in accordance with the expression set forth hereinabove.

The manganese to nitrogen ratio must be at least 42 (preferably 45) and the sum of the chromium, manganese, nickel and molybdenum contents must be at least 38. Manganese must be present in sufficient quantity to insure that the alloy can accommodate its nitrogen without producing a porous, unsound, weld, and the sum of the manganese, chromium, nickel and molybdenum content must be at least 38 to insure that the alloy is austenitic, has sufficient strength and corrosion resistance and can accommodate its nitrogen content.

The method of the present invention comprise the steps of providing two restrained metallic parts and a filler metal (weld wire) having the composition discussed above, melting the filler metal by arc welding and depositing the molten metal between the restrained members. Melting and depositing is performed in a shielding atmosphere and can be performed with the filler metal serving as an electrode or with a non-consumable electrode; e.g., a tungsten electrode. Typical shielding atmospheres are argon, helium, nitrogen and mixture thereof. Nitrogen gas can have the additional benefit of increasing the nitrogen content in the area of the weld.

The following examples are illustrative of the invention. They are directed to the welding of stainless steel members despite the fact that the invention is believed to be adaptable to the welding of a variety of metals, including other alloy steels and carbon steels, as the welding of stainless steel probably constitutes the most important use for the invention. More specifically, they are directed to the welding of stainless steel members having up to 0.1 percent carbon, 2 – 3 percent molybdenum, up to 0.5 percent silicon, 7.5 – 9.0 percent manganese, 17.5 – 22.0 percent chromium, 5 – 7 percent nickel, 0.25 – 0.50 percent nitrogen, balance iron and incidental impurities.

EXAMPLE I

One-half inch thick annealed stainless steel plates having a composition within the range of, hereinabove referred to, U.S. Pat. No. 3,171,738, were welded with several different 0.062 inch round filler wires. The composition of the plates was 0.026 percent carbon, 7.50 percent manganese, 0.23 percent silicon, 19.70 percent chromium, 6.55 percent nickel, 2.52 percent molybdenum, 0.34 percent nitrogen and balance iron. The composition of the filler wires is given below in Table I along with their percent manganese to percent nitrogen ratios.

TABLE I

| Filler Wire | C | Mn | Si | Cr | Ni | Mo | N | Fe | %Mn/%N |
|---|---|---|---|---|---|---|---|---|---|
| A | 0.02 | 8.25 | 0.49 | 19.33 | 5.92 | 2.64 | 0.33 | bal | 25.0* |
| B | 0.019 | 15.93 | 0.28 | 19.43 | 5.75 | 2.55 | 0.44 | bal | 36.2 |
| C | 0.027 | 11.23 | 0.40 | 18.93 | 10.24 | 2.56 | 0.28 | bal | 40.0 |
| D | 0.025 | 13.13 | 0.48 | 19.62 | 15.29 | 2.43 | 0.20 | bal | 65.7 |

*manganese and nitrogen contents for filler wire A were taken from a ladle analysis whereas manganese and nitrogen contents for filler wires B, C and D were taken from a wire analysis.

The plates were GMAW, gas metal arc welded (spray arc) at a weld speed of 12 to 17 inches per minute with a current of from 295 to 305 amps in an argon–2 percent oxygen atmosphere. Filler metal was deposited in a 60° DV (double v) bevel with a 1/16-inch land.

An analysis of the welds was made using radiographic (X-ray) techniques. The analysis comprised a tabulation of the total number of pores present in a 6-inch bead length, an observance as to the maximum pore diameter, a tabulation as to the total pore area (the area is determined by multiplying the number of pores by $(\pi D^2/4)$ wherein D is the average diameter of the pores) and an observance as to whether there was pore alignment and/or pore clustering. The results of the analysis are set forth below in Table II.

TABLE II

| Weld formed from Filler Wire | Number of Pores | Weld Analysis Maximum Pore Diameter (inches) | Total Pore Area (square inches) | Pore Alignment | Pore Clustering |
|---|---|---|---|---|---|
| A | 164 | 0.09 | 0.1086 | Yes | Yes |
| B | 49 | 0.07 | 0.0520 | No | Yes |
| C | 17 | 0.07 | 0.0205 | Yes | No |
| D | 9 | 0.06 | 0.0129 | No | No |

A study of the results of Table II reveals that the soundness of the welds increases with increasing manganese to nitrogen ratios. The weld formed from filler wire D (Mn/N ratio of 65.7) was superior to the weld formed from filler wire C (Mn/N ratio of 40.0), which in turn was superior to the weld formed from filler wire B (Mn/N ratio of 36.2), which in turn was superior to the weld formed from filler wire A (Mn/N ratio of 25.0). More specifically, the results show a sound weld formed from filler wire D, a weld just short of adequate soundess formed from filler wire C, and two unsound welds formed from filler wires B and A (a composition within the range of, hereinabove referred to, U.S. Pat. No. 3,171,738). The soundness of a weld increases with decreasing pore counts, with decreasing pore sizes, with decreasing pore area, and when pore alignment and pore clustering are minimized.

EXAMPLE II

The weld bead produced from the alloy of this invention has a strength substantially equivalent to the alloy described in U.S. Pat. No. 3,171,738, when welded to the alloy of said patent. For example, the 0.2 percent longitudinal yield strength and ultimate tensile strength for a ½-inch annealed plate having the composition of the plates welded in Example I was respectively 65 ksi and 102 ksi whereas the 0.2 percent yield strength and ultimate tensile strength of a weld bead formed from 0.062 inch round filler wire D which was GMAW welded to ½-inch plates of said alloy from said patent was respectively 65 ksi and 105 ksi.

It will be apparent to those skilled in the art that the novel principles of the invention disclosed herein in connection with specific examples thereof will suggest various other modifications nd applications of the same. It is accordingly desired that in construing the breadth of the appended claims they shall not be limited to the specific examples of the invention described herein.

We claim:

1. A process for producing a sound weld between two metallic members, which comprises the steps of: (1) providing two metallic members and a filler metal, said filler metal consisting essentially of, in weight percent, up to 0.1 percent carbon, 8.5 – 16.0 percent manganese, up to 1.0 percent silicon, 17.5 – 26.0 percent chromium, 5.0 – 17.0 percent nickel, 0.75 – 4.0 percent molybdenum, 0.2 – 0.38 percent nitrogen, balance iron and incidental impurities, said filler metal having a ratio of austenitizing elements to ferritizing elements in excess of 1 in accordance with the following expression:

[%Ni + 30 (%C + %N) + 0.5 (%Mn)/%Cr + %Mo + 1.5 (%Si)] > 1 manganese and nitrogen contents balanced in accordance with the following expression:

%Mn/%N ≧ 42 and chromium, manganese, nickel and molybdenum contents in accordance with the following expression:

%Mn + %Cr + %Ni + %Mo ≧ 38%

(2) restraining said members in a fixed position; (3)

melting said filler metal by arc welding in a shielding atmosphere; and (4) depositing the metal between the restrained metallic members, thereby forming a weld.

2. A process according to claim 1 wherein said metallic members are stainless steel members.

3. A process according to claim 1 wherein said filler metal has a ratio of austenitizing elements to ferritizing elements in excess of 1.1.

4. A process according to claim 1 wherein said filler metal has a percent manganese to percent nitrogen ratio of at least 45.

5. A process according to claim 1 wherein said filler metal serves as an electrode.

6. A process according to claim 1 wherein said shielding atmosphere is comprised of argon.

7. A process according to claim 1 wherein said shielding atmosphere is comprised of nitrogen.

8. A process according to claim 1 wherein said metallic members consist essentially of, in weight percent, up to 0.1 percent carbon, 2 – 3 percent molybdenum, up to 0.5 percent silicon, 7.5 – 9.0 percent manganese, 17.5 – 22.0 percent chromium, 5 – 7 percent nickel, 0.25 – 0.50 percent nitrogen, balance iron and incidental impurities.

9. A process according to claim 1 wherein said filler metal has 8.5 – 14 percent manganese.

10. A process according to claim 9 wherein said filler metal has 18.5 – 23.0 percent chromium, 10 – 16 percent nickel and 2 – 3 percent molybdenum.

11. A process according to claim 10 wherein said filler metal has up to 0.05 percent carbon and up to 0.4 percent silicon.

* * * * *